United States Patent [19]
Ishikawa et al.

[11] Patent Number: 5,351,169
[45] Date of Patent: Sep. 27, 1994

[54] LIGHTING DEVICE

[75] Inventors: Seiji Ishikawa; Hajime Murakami, both of Chigasaki, Japan

[73] Assignee: Mitsubishi Kasei Corporation, Tokyo, Japan

[21] Appl. No.: 51,618

[22] Filed: Apr. 23, 1993

[30] Foreign Application Priority Data

Apr. 23, 1992 [JP] Japan .................................. 4-129282

[51] Int. Cl.⁵ .............................................. G02B 21/06
[52] U.S. Cl. ...................... 362/32; 362/312; 362/346; 359/385; 359/389
[58] Field of Search ............... 363/321, 297, 298, 319, 363/321, 346, 138, 140; 359/385, 386, 387, 388, 389

[56] References Cited

U.S. PATENT DOCUMENTS

2,097,762 11/1937 Heine ................................ 359/386
4,585,315 4/1986 Sincerbox et al. ................. 359/387

FOREIGN PATENT DOCUMENTS

0178421 10/1984 Japan ................................ 359/388
0242214 9/1990 Japan ................................ 359/389
4086614 5/1992 Japan ................................ 359/385

*Primary Examiner*—Ira S. Lazarus
*Assistant Examiner*—Y. Quach
*Attorney, Agent, or Firm*—Oblon, Spivak, McClelland, Maier & Neustadt

[57] ABSTRACT

A lighting device capable of lighting a surface of an observed section of a specimen sample so as to permit an object of observation of the surface to be satisfied even when the surface has relatively fine unevenness. Any one of light field illumination mainly using vertically projected light, dark field illumination mainly using laterally projected light and a combination thereof is selectively carried out with respect to the surface of the specimen sample as desired, to thereby selectively provide a lighted two-dimensional image of the surface and its lighted three-dimensional image as desired.

4 Claims, 5 Drawing Sheets

LIGHTING DEVICE

BACKGROUND OF THE INVENTION

This invention relates to a lighting device for an observation unit, an image pickup unit or the like which is used for observing or picking up an image of a surface of a specimen sample, and more particularly to an improvement in a lighting device which is adapted to light or illuminate a surface of a section to be observed (hereinafter referred to as "observed section") of a specimen sample while providing a light field due to vertical projection and/or a dark field due to lateral projection as required.

There are conventionally known an observation unit for observing an image or magnified image of a surface of an observed section of a specimen sample which is an object subject to observation and an image pickup unit for displaying the image on a picture plane of a monitor TV to indirectly observe it. Each of the observation unit and the image pickup unit is adapted to locate a lighting head or an image pickup head each having a projecting means incorporated therein in a manner to face the surface of the observed section of the specimen sample to light the observed section, to thereby permit the observation to be carried out. In each of the observation unit and image pickup unit thus constructed, lighting is generally carried out by a vertical projection method mainly using vertically projected light wherein parallel light beams are vertically irradiated to a longitudinal surface portion of the surface of the observed section of the specimen sample in a direction perpendicular thereto or by a lateral projection method mainly using laterally projected light wherein light beams are obliquely irradiated to the longitudinal surface portion of the surface of the observed section a direction oblique with respect to the surface portion.

However, when the surface of the specimen sample which is an object subject to observation has relatively fine unevenness, individual execution of the vertical projection method or lateral projection method fails to permit the fine unevenness on the surface to be precisely observed. In order to avoid the problem, concurrent execution of both projection methods would be considered. Unfortunately, this causes the observation device or image pickup device to be highly complicated in structure.

SUMMARY OF THE INVENTION

The present invention has been made in view of the foregoing disadvantage of the prior art.

Accordingly, it is an object of the present invention to provide a lighting device which is capable of being suitable for use for an observation unit, an image pickup unit or the like while solving the above-described problems of the prior art.

It is another object of the present invention to provide a lighting device which is capable of carrying out satisfactory lighting or illumination irrespective of conditions of a surface of an observed section of a specimen sample.

It is a further object of the present invention to provide a lighting device which is capable of selectively accomplishing at least one of light field lighting and dark field lighting depending on a purpose of observation carried out on a surface of an observed section of a specimen sample.

In accordance with the present invention, a lighting device is provided. The lighting device includes a tube body constituted by a cylindrical barrel. The cylindrical barrel has a central optical axis defined therein and is formed at a lower end portion thereof with an objective opening in a manner to face a surface of an observed section of a specimen sample. The lighting device also includes a light guide cylinder arranged in a lower portion of the cylindrical barrel so that a central axis thereof is aligned with the optical axis. The objective opening is divided into a central region in which a light field area is defined and a peripheral region which is defined outside the central region and in which a dark field area is defined. The cylindrical barrel is formed at an upper portion thereof with a light field light inlet opening through which light field light of which the quantity is adjusted is introduced into the cylindrical barrel. The lighting device further includes a semitransparent reflection mirror provided in the cylindrical barrel so as to positionally correspond to the light field light inlet opening and be aligned with the optical axis. The semitransparent reflection mirror reflects the introduced light field light to form vertically projected light irradiated on the light field area, to thereby illuminate light toward a longitudinal surface portion of the surface of the observed section of the specimen sample in a direction perpendicular thereto. The cylindrical barrel is formed at a lower portion thereof with a dark field light inlet opening through which dark field light of which the quantity is adjusted is introduced into the cylindrical barrel. Moreover, the lighting device includes a first reflection mirror arranged on an outer periphery of the light guide cylinder in the cylindrical barrel so as to positionally correspond to the dark field light inlet opening and reflecting the introduced dark field light to form vertically projected light directed through a space between the light guide cylinder and the cylindrical barrel to the dark field area, as well as a second reflection mirror arranged on an inner periphery of a lower end of the cylindrical barrel and reflecting the vertically projected dark field light to form laterally projected light directed to the light field area, to thereby light a lateral surface portion of the surface of the observed section of the specimen sample in a direction lateral with respect to the surface portion; whereby any one of illumination by both light field light and dark field light of each of which the quantity is adjusted as required, illumination by only the light field light, and illumination by only the dark field light is selected as desired.

In a preferred embodiment of the present invention, the lighting device may further comprise a light field luminous source for emitting the light field light and a dark field luminous source for emitting the dark field light, which are provided independent from each other; and a light field light adjusting slit member for adjusting the quantity of the light field light emitted by the light field luminous source and a dark field light adjusting slit member for adjusting the quantity of the dark field light emitted by the dark field luminous source.

In another preferred embodiment of the present, the lighting device may further comprise a common luminous source for the light field light and dark field light, whereby light emitted from the common luminous source is divided into the light field light and dark field light; and a light field light adjusting slit member for adjusting the quantity of the light field light and a dark field light adjusting slit member for adjusting the quantity of the dark field light.

In a further embodiment of the present invention, the lighting device may further comprise a light field luminous source for emitting the light field light and a dark field luminous source for emitting the dark field light, which are provided independent from each other, wherein the light field luminous source and dark field luminous source each are applied thereto a voltage, to thereby permit the quantity of each of the light field light and dark field light emitted by the luminous sources to be adjusted.

In the lighting device of the present invention constructed as described above, the luminous sources for the light field light and dark field light are turned on while keeping the objective opening of the tube body positioned right opposite to the surface of the observed section of the specimen sample. Then, light field light of which the quantity is adjusted is introduced through the light field light inlet opening into the cylindrical barrel and downwardly reflected by the semitransparent reflection mirror to form vertically projected light, which straight travels to the light field area to illuminate the longitudinal surface portion of the surface of the specimen sample in a direction perpendicular to the surface portion. Whereas, dark field light of which the quantity is adjusted is introduced through the dark field light inlet opening into the cylindrical barrel and then downwardly reflected by the first reflection mirror to form vertically projected light, which then travels through the space between the cylindrical barrel and the light guide cylinder toward the dark field area. Thereafter, the dark field light is laterally reflected by the second reflection mirror to form laterally projected light, which then travels to the light field area to illuminate the lateral surface portion of the surface of the specimen sample in a direction lateral with respect to the surface portion. Thus, the present invention permits any one of illumination by both light field light and dark field light of each of which the quantity is adjusted as required, illumination by only the light field light, and illumination by only the dark field light to be selected as desired, resulting in selectively providing a lighted two-dimensional image of the surface and its lighted three-dimensional image as desired.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein:

FIG. 1 is a schematic sectional view showing a first manner of lighting operation of an embodiment of a lighting device according to the present invention which is applied to an observation unit, an image pickup unit or the like;

FIG. 4 is a schematic sectional view showing a first manner of lighting operation of a second embodiment of a lighting device according to the present invention which is applied to an observation unit, an image pickup unit or the like; and FIG. 5 is a schematic sectional view showing a first manner of lighting operation of a third embodiment of a lighting unit according to the present invention which is applied to an observation unit, an image pickup unit or the like.

DETAILED DESCRIPTION OF THE PREFERRED EMBODIMENTS

Now, a lighting device according to the present invention will be described hereinafter with reference to the accompanying drawings.

Figure 1:
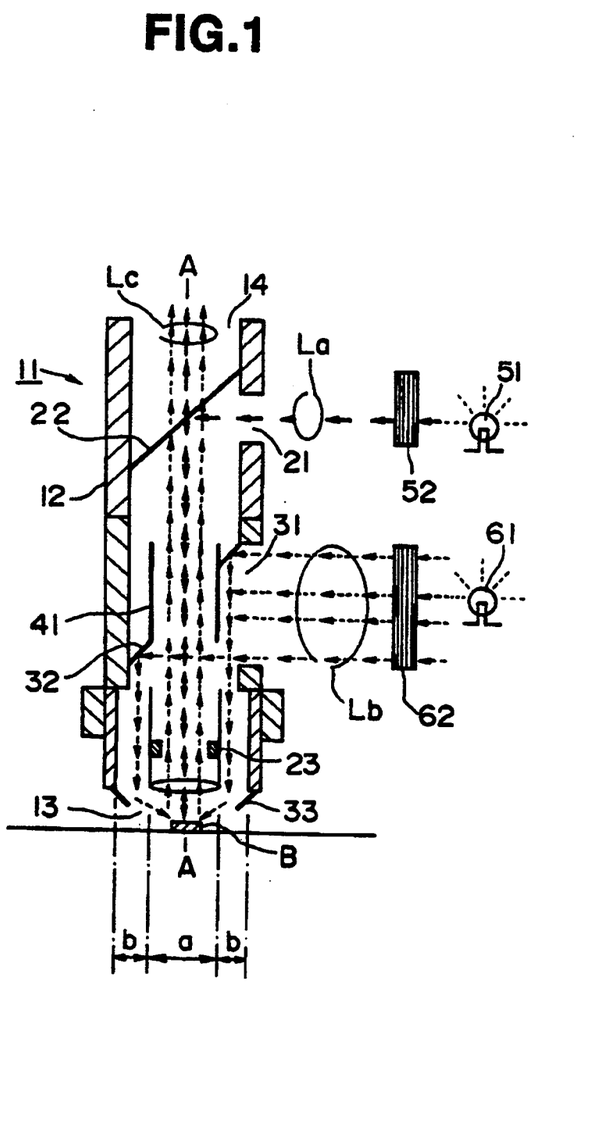
Figure 2:
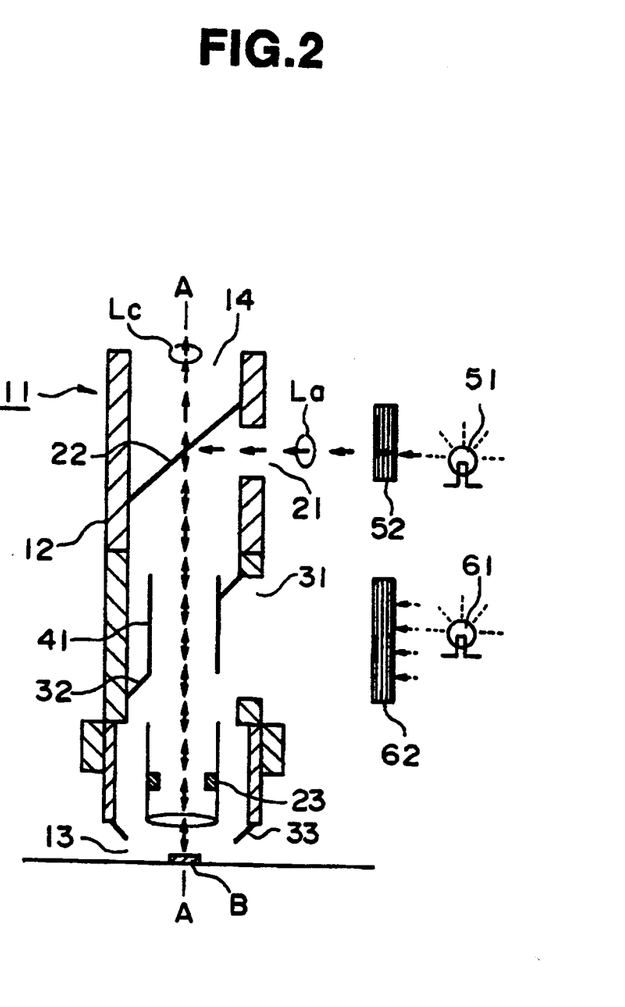
FIG. 2 is a schematic sectional view showing a second manner of lighting operation of the lighting device shown in FIG. 1.
Figure 3:
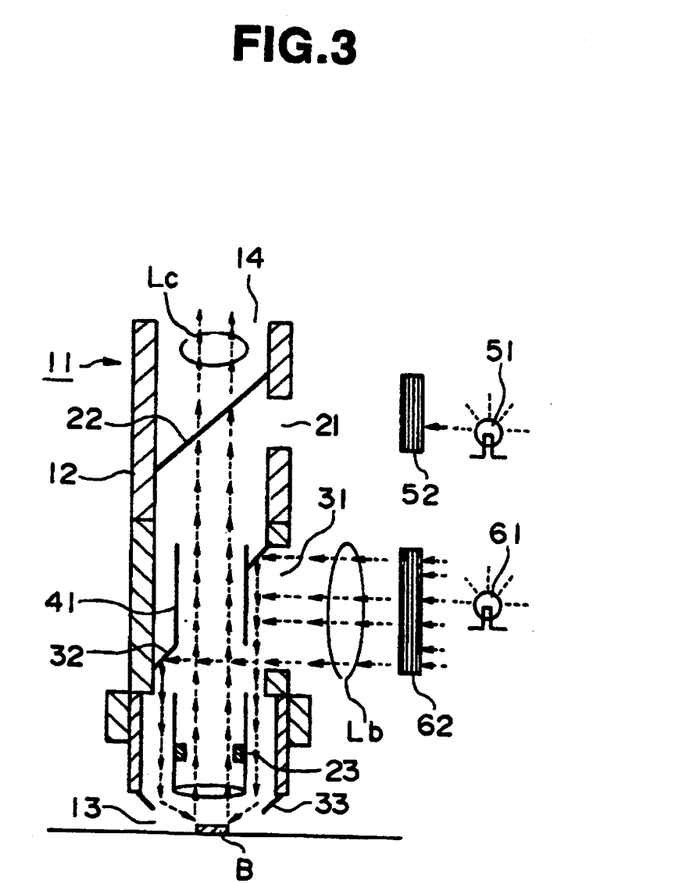
FIG. 3 is a schematic sectional view showing a third manner of lighting operation of the lighting device shown in FIG. 1.

Referring first to FIGS. 1 to 3, a first embodiment of a lighting device according to the present invention which is effectively applied to an observation unit, an image pickup unit or the like is illustrated. A lighting device of the illustrated embodiment includes a tube body 11, which includes a cylindrical barrel 12. The cylindrical barrel 12 is formed at a lower portion thereof with an objective opening 13 in such a manner that a longitudinal central axis of the opening 13 is aligned with a central optical axis A defined in the cylindrical barrel 12. The objective opening 13 is arranged so as to face a surface of an observed section of a specimen sample B. Also, the cylindrical barrel 12 is formed at an upper portion thereof with a light guide opening 14 for guiding, toward an observation section (not shown), reflected light Lc obtained by irradiating the surface of the observed section of the specimen sample B with illuminating light for a light field (hereinafter referred to as "light field light") designated at reference character La and/or illuminating light for a dark field (hereinafter referred to as "dark field light") designated at reference character Lb. Further, in the opening 13 of the cylindrical barrel 12, a light field area a is defined in a manner to be positioned in a central region about the optical axis A and a dark field area b is defined in a manner to be positioned in a peripheral region outside the central region.

The cylindrical barrel 12 is also formed on one side of the upper portion thereof with a light field light inlet opening 21 of a relatively small area for light field illumination and at a portion thereof below the opening 21 on the same side with a dark field light inlet opening 31 of a relatively large area. In addition, the cylindrical barrel 12 is provided on an inside thereof positionally corresponding to the dark field light inlet opening 31 with a light guide cylinder 41 which is so arranged that a longitudinal central axis thereof is aligned with the optical axis A. The light guide cylinder 41 acts to partition the light field area a in the central region and the dark field area b in the peripheral region from each other, so that the inside of the cylinder 41 permits the light field light La to be guided to the light field area a in the central region and the outside of the cylinder 41 permits the dark field light Lb to be guided to the dark field area b in the peripheral region.

The lighting device of the illustrated embodiment also includes a luminous source for a light field (hereinafter referred to as "light field luminous source") designated at reference numeral 51 which is adapted to carry out light field illumination and a slit member for adjusting the quantity of light for a light field (hereinafter referred to as "light field light adjusting slit member") designated at reference numeral 52. The luminous source 51 and slit member 52 are arranged outside the cylindrical barrel 12 so as to be opposite to each other and positionally correspond to the light field light inlet opening 21 with the slit member 52 being interposed between the opening 21 and the luminous source 51. The luminous source 51 may comprise a halogen lamp, an ultraviolet (UV) lamp or the like. The slit member 52 functions to adjust the quantity of light emitted from the luminous source 51 upon turning-on of the source within a range of between, for example, 0% of the total light quantity and 100% thereof and, as required, adjust a direction of the light so as to permit it to be directed toward the light field light inlet opening 21. Also, the lighting device may include a lens (not shown) for suitably forming the light into parallel light beams. The cylindrical barrel 12 is provided therein with a half mirror or semitransparent reflection mirror 22, which is arranged so as to permit the light field light La introduced through the light field light inlet opening 21 into the barrel 12 to be guided as vertically projected light along the central optical axis A toward the light field area a in the central region of the objective opening 13 and permit the reflected light Lc to be taken out from the surface of the observed section of the specimen sample B. The light guide cylinder 41 is provided at a lower portion of an inside thereof with a fixed or variable constriction 23 for restricting a range of irradiation or vertical projection of the light field light La reflected by the reflection mirror 22, to thereby improve resolution.

In addition, the lighting device of the illustrated embodiment further includes a luminous source for a dark field (hereinafter referred to as "dark field luminous source") designated at reference numeral 61 which is adapted to carry out light field illumination and a slit member for adjusting the quantity of light for a dark field (hereinafter referred to as "dark field light adjusting slit member") designated at reference numeral 62. The dark field luminous source 61 and slit member 62 are arranged outside the cylindrical barrel 12 so as to be opposite to each other and positionally correspond to the dark field light inlet opening 31 with the slit member 62 being interposed between the opening 31 and the luminous source 61. The luminous source 61 may comprise a halogen lamp, an ultraviolet (UV) lamp or the like. The slit member 62 functions to adjust the quantity of light emitted from the luminous source 61 upon turning-on of the source 61 within a range between, for example, 0% of the total light quantity and 100% thereof and, as required, adjust a direction of the light so as to permit it to be directed toward the dark field light inlet opening 31. Also, the lighting device may include a diffusion filter (not shown) for suitably eliminating unevenness of concentration of the light. The cylindrical barrel 12 is provided therein with a first reflection mirror 32, which is arranged so as to permit the dark field light Lb introduced through the dark field light inlet opening 31 into the barrel 12 to be guided, as vertically projected light, in parallel to the central optical axis A toward the dark field area b in the peripheral region of the objective opening 13. Further, the cylindrical barrel 12 is provided at a portion thereof below the first reflection mirror 32 with a second reflection mirror 33 so as to be positioned in the objective opening 13. The second reflection mirror 33 is arranged so as to permit the dark field light Lb reflected by the first reflection mirror 32 and then vertically projected to be re-reflected by the second reflection mirror, to thereby be directed in the form of laterally projected light from the dark field area b to the light field area a.

Now, the manner of operation of the lighting device of the illustrated embodiment will be described hereinafter with reference to FIG. 1 showing a first lighting manner wherein the specimen sample B is observed utilizing both light field lighting and dark field lighting.

First, the quantity of light field light La and that of dark field light Lb are selectively adjusted through the light field light adjusting slit member 52 and dark field light adjusting slit member 62 as required, respectively, while keeping the objective opening 13 of the tube body 11 right opposite to the surface of the observed section of the specimen sample B which is an object subject to observation and keeping the light field luminous source 51 and dark field luminous source 61 turned-on to emit light therefrom.

Then, the light field light La is introduced through the light field light inlet opening 21 into the tube body 11 while being kept perpendicular to central optical axis A and then reflected by the semitransparent reflection mirror 22. This results in the light field light La forming vertically projected light which downwardly travels parallel to the central optical axis A toward the light field area a of the central region in the light guide cylinder 41. Then, the light field light La is constricted through the constriction 23, to thereby light the whole surface of the observed section of the specimen sample B in a direction perpendicular to a longitudinal surface portion of the surface, resulting in a lighted image of the surface of the observed section being longitudinally two-dimensionally observed. More particularly, this mainly results in a lighted image of the longitudinal surface portion of the surface being two-dimensionally observed. Then, light forming the image upwardly travels as reflected light in the light guide cylinder 41 and passes through the semitransparent reflection mirror 22, resulting in being picked up through the light guide opening 14 by the observation section (not shown). Thus, the two-dimensional image of the longitudinal surface portion of the surface of the specimen sample B can be observed while being lighted, as desired. The quantity of the light field light La to be irradiated may be adjusted through the slit member 52, to thereby permit the observation to be more satisfactorily carried out.

The dark field light Lb is introduced through the dark field light inlet opening 31 into the tube body 11 so as to be perpendicular to the central optical axis A and then reflected by the first reflection mirror 32. This causes the dark field light Lb to form vertically projected light which downwardly straight travels parallel to the central optical axis A through a space between the cylindrical barrel 12 and the light guide cylinder 41 toward the dark field area b of the peripheral region. Subsequently, the dark field light Lb is reflected by the second reflection mirror 33 in the dark field area b, to thereby form laterally projected light, which straight travels toward the light field area a of the central region. This results in the dark field light Lb or laterally projected light illuminating the surface of the observed section of the specimen sample B in a direction parallel to the surface, to thereby permit the surface to be laterally two-dimensionally observed. A lighted image or observed image of the surface thus obtained travels upwardly as reflected light in the light guide cylinder 41 and passes through the semitransparent reflection mirror 22, resulting in being picked up through the light inlet opening 14 by the observation section. Thus, the lighted lateral image of the surface of the specimen sample B can be observed as desired. More particularly, this mainly permits a lighted image of a lateral surface portion of the surface of the specimen sample B to be two-dimensionally obtained. The quantity of irradiation of the dark field light Lb may be adjusted through the slit member 62, to thereby permit the observation to be more satisfactorily carried out.

Thus, in the lighting device of the illustrated embodiment, the light field light La forms vertically projected light which independently lights or illuminates the surface of the observed section of the specimen sample B in a direction right opposite or perpendicular to the surface of the observed section or along the optical axis A, to thereby mainly provide a lighted longitudinal two-dimensional image of the surface. Concurrently, the dark field light Lb forms laterally projected light directed from the dark field area b to the light field area a, which independently lights the surface of the specimen sample in a direction substantially parallel to the surface of the observed section or in a direction substantially perpendicular or oblique to the optical axis, to thereby provide lighted lateral two-dimensional image of the surface. Thus, the lighting device of the illustrated embodiment permits lighting carried out mainly by the vertically projected light and that mainly by the laterally projected light to cooperate with each other to form lighted three-dimensional image of the surface which can be readily observed. Further, the quantities of light field light La and dark field light Lb may be adjusted during observation of the lighted image, to thereby permit a dark shadow portion of the image to be eliminated, to thereby facilitate the observation.

Further, the manner of operation of the lighting device of the illustrated embodiment will be described hereinafter with reference to FIG. 2 showing a second lighting manner wherein the specimen sample B is observed utilizing only light field lighting. Similar to the first lighting manner described above with reference to FIG. 1, the objective opening 13 of the tube body 11 is kept right opposite to the longitudinal surface portion of the surface of the observed section of the specimen sample B which is an object subject to observation and the light field luminous source 51 and dark field luminous source 61 are kept turned-on to emit light field light La and dark field light Lb therefrom, respectively. Then, the quantity of the dark field light Lb emitted is restricted to a level of 0% through the dark field light adjusting slit member 62, resulting in a situation as if the dark field luminous source 61 were kept turned off. Alternatively, the dark field luminous source 61 is turned off and only the light field luminous source 51 is kept turned on, and the quantity of the light field light La emitted is selectively adjusted through the light field light adjusting slit member 52 as required, resulting in forming only the light field light La into vertically projected light. The vertically projected light thus obtained lights or illuminates the whole surface of the observed section of the specimen sample B in a direction perpendicular to the longitudinal surface portion of the surface of the observed section or in a direction parallel to the optical axis A, to thereby permit the surface to be longitudinally two-dimensionally observed. Adjustment of the quantity of irradiation of the light field light La permits the observation to be more satisfactorily carried out.

Moreover, the manner of operation of the lighting device of the illustrated embodiment will be described hereinafter with reference to FIG. 3 showing a third lighting manner wherein the specimen sample B is observed utilizing only dark field lighting. The objective opening 13 of the tube body 11 is kept right opposite to the longitudinal surface portion of the surface of the observed section of the specimen sample B and the light field luminous source 51 and dark field luminous source 61 are kept turned-on to emit light field light La and dark field light Lb light therefrom, respectively. Then, the quantity of the light field light La emitted is restricted to a level of 0% through the light field light adjusting slit member 52, resulting in a situation as if the light field luminous source were kept turned off. Alternatively, the light field luminous source 51 is turned off and only the dark field luminous source 61 is kept turned on, and the quantity of the dark field light Lb emitted is selectively adjusted through the dark field light adjusting slit member 62 as required, to thereby form only the dark field light Lb into laterally projected light. The laterally projected light thus obtained illuminates the whole surface of the observed section of the specimen sample B in a direction substantially parallel to the longitudinal surface portion of the observed section, to thereby permit the surface to be laterally two-dimensionally observed. Adjustment of the quantity of irradiation of the dark field light Lb permits the observation to be more satisfactorily carried out.

Figure 4:
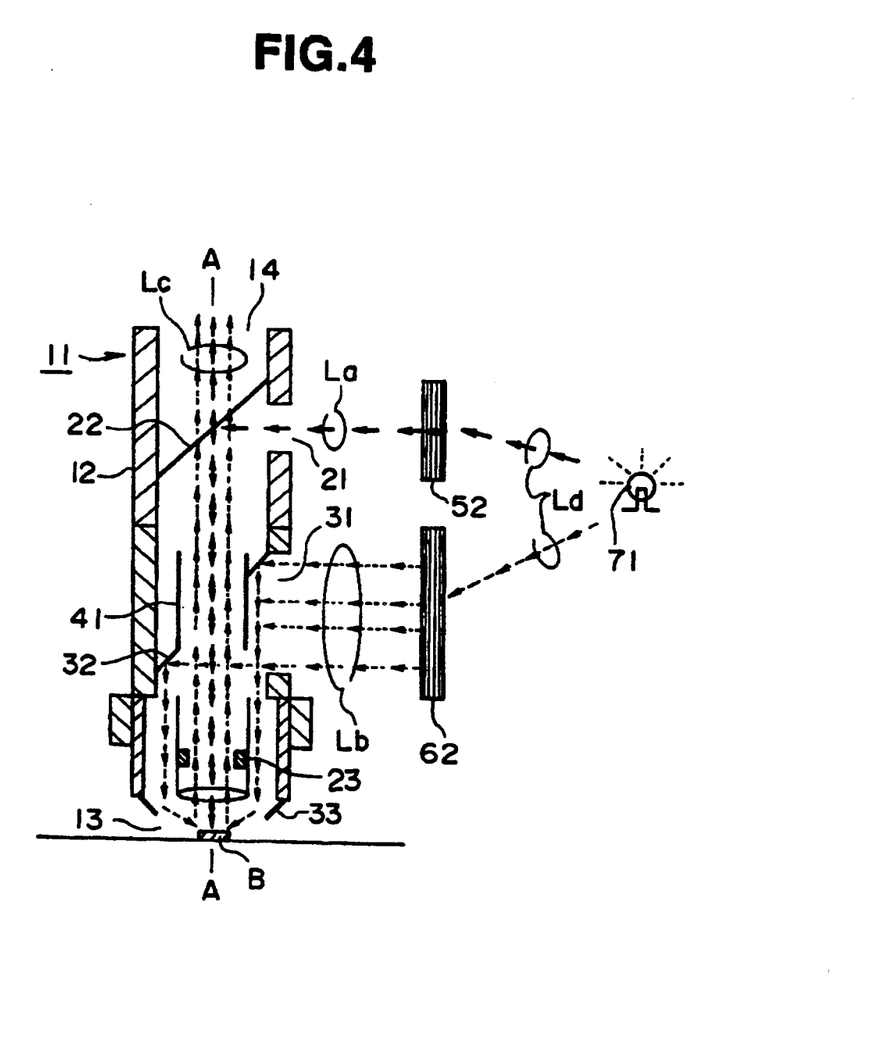

Referring now to FIG. 4, a second embodiment of a lighting device according to the present invention is illustrated, wherein a lighting device of the second embodiment is practived in the same manner as the first lighting manner of the first embodiment described above with reference to FIG. 1. In a lighting device of the illustrated embodiment, a single luminous source 71 which may likewise comprise a halogen lamp, an ultraviolet (UV) lamp or the like is commonly used to produce light field light La and dark field light Lb. More particularly, light Ld for illumination emitted commonly from the common luminous source 71 is guided to both a light field side and a dark field side through a suitable means such as optical fibers or the like. Light guided to the light field side passes through a light field light adjusting slit member 52, so that light field light La of which the quantity is adjusted is output; whereas light guided to the dark field side likewise passes through a dark field light adjusting slit member 62, so that dark field light La of which the quantity is adjusted is output. Thus, the second embodiment may be operated in substantially the same manner as the first lighting manner of the first embodiment described above with reference to FIG. 1. The remaining part of the second embodiment may be constructed in substantially the same manner as the first embodiment.

Also, the lighting device of the second embodiment may carry out operation in the same lighting manner as the second lighting manner of the first embodiment described above with reference to FIG. 2 by outputting light field light La of which the quantity is adjusted through the slit member 52 on the light field side and fully closing, on the dark field side, the dark field light adjusting slit member 62 to interrupt dark field light Lb. Also, operation of the lighting device of the second embodiment in the same lighting manner as the third lighting manner of the first embodiment may be carried out by fully closing the light field light adjusting slit member 52 to interrupt light field light La, resulting in only dark field light Lb of which the quantity is adjusted through the dark field light adjusting slit member 62 being output.

Figure 5:
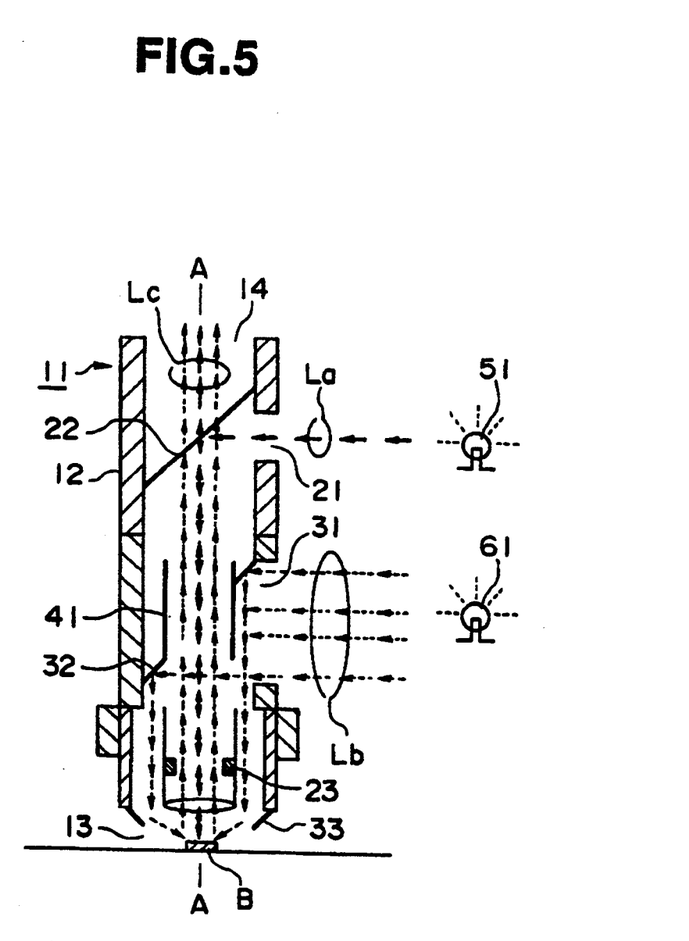

Referring now to FIG. 5, a third embodiment of a lighting device according to the present invention is illustrated, wherein a lighting device of the third embodiment is operated in the same manner as the first lighting manner of the first embodiment described above with reference to FIG. 1. In the lighting device of the illustrated embodiment, the light field light adjusting slit member 52 and dark field light adjusting slit member 62 used in the first embodiment shown in FIGS. 1 to 3 are omitted. Substitutely, adjustment of the quantity of each of light field light La and dark field light Lb is carried out by adjusting a voltage applied to each of luminous sources 51 and 61. The remaining part of the third embodiment may be constructed in substantially the same manner as the first embodiment. Thus, it will be noted that the third embodiment simplifies the structure of the lighting device.

Also, the third embodiment constructed as described above may carry out operation in the same lighting manner as the second lighting manner of the first embodiment described above with reference to FIG. 2 by controlling a voltage applied to the light field luminous source 51 to adjust the quantity of light field light La which is then output and by interrupting application of a voltage to the dark field luminous source 61 to prevent emission of the light from the luminous source 61. Further, the lighting device of the third embodiment may be operated in the same lighting manner as the third lighting manner of the first embodiment shown in FIG. 1 by interrupting feeding of electric power to the light field luminous source 51 to prevent emitting of light field light La and controlling a voltage applied to the dark field luminous source 61 to output dark field light Lb of which the quantity is adjusted.

As can be seen foregoing, the lighting device of the present invention is so constructed in the manner that the light field luminous source and dark field luminous source are turned on to emit light therefrom while keeping the objective opening of the tube body right opposite to the surface of the observed section of the specimen sample and light field light and dark field light of each of which the quantity is adjusted are output. Then, the light field light is irradiated as vertically projected light on the whole surface of the observed section of the specimen sample in a direction perpendicular to the longitudinal surface portion of the surface in the light field area of the central region of the objective opening to mainly obtain a lighted image of the longitudinal surface portion and the dark field is irradiated as laterally projected light on the whole surface of the observed section from the dark field area of the peripheral section to the light field area or in a direction parallel to the longitudinal surface portion of the surface of the objected section to mainly obtain a lighted image of the lateral surface portion of the surface of the observed section. The lighted images thus obtained can be selectively observed while being changed over as desired. Alternatively, the light field illumination and dark field illumination can be synthesized to provide a lighted three-dimensional image of the surface which can be readily observed. Thus, the present invention permits the surface of the observed section of the specimen sample to be readily observed in a desired manner depending on an object of the observation.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is Claimed is:

1. A lighting device comprising:
a tube body including a cylindrical barrel;
said cylindrical barrel having a central optical axis defined therein and being formed at a lower end portion thereof with an objective opening in a manner to face a surface of an observed section of a specimen sample;
a light guide cylinder arranged in a lower portion of said cylindrical barrel so that a central axis thereof is aligned with said optical axis;
said objective opening being divided into a central region in which a light field area is defined and a peripheral region which is defined outside said central region and in which a dark field area is defined;
said cylindrical barrel being formed at an upper portion thereof with a light field light inlet opening through which light field light of which the quantity is adjusted is introduced into said cylindrical barrel;
a semitransparent reflection mirror provided in said cylindrical barrel so as to positionally correspond to said light field light inlet opening, wherein a plane of said semitransparent reflection mirror intersects said optical axis.
said semitransparent reflection mirror reflecting said introduced light field light to form vertically projected light irradiated on said light field area, to thereby light a longitudinal surface portion of said surface of said observed section of said specimen sample;
said cylindrical barrel being formed at a lower portion thereof with a dark field light inlet opening through which dark field light of which the quantity is adjusted is introduced into said cylindrical barrel;
a first reflection mirror arranged on an outer periphery of said light guide cylinder in said cylindrical barrel so as to positionally correspond to said dark field light inlet opening and reflecting said introduced dark field light to form vertically projected light directed through a space between said light guide cylinder and said cylindrical barrel to said dark field area; and
a second reflection mirror arranged on an inner periphery of a lower end of said cylindrical barrel and reflecting said vertically projected dark field light to form laterally projected light directed to said light field area, to thereby light a lateral surface portion of said surface of said observed section of said specimen sample;
wherein either said light field light or dark field light can be selected and adjusted in the luminescent thereof whereby any one of illumination by both light field light and dark field light of each of which the quantity is adjusted as required, illumination by only the light field light, and illumination by only the dark field light is selected as desired.

2. A lighting device as defined in claim 1, further comprising a light field luminous source for emitting said light field light and a dark field luminous source for emitting said dark field light, said light field luminous source and dark field luminous source being provided independent from each other; and a light field light adjusting slit member interposed between said light field luminous source and said light field light inlet opening for adjusting the quantity of said light field light emitted by said light field luminous source and a dark field light adjusting slit member interposed between said dark field light luminous source and said dark field light inlet opening for adjusting the quantity of said dark field light emitted by said dark field luminous source.

3. A lighting device as defined in claim 1, further comprising a common luminous source for said light field light and dark field light, whereby light emitted from said luminous source is divided into said light field light and said dark field light; and a light field light adjusting slit member interposed between said light field luminous source and said light field light inlet opening for adjusting the quantity of said light field light and a dark field light adjusting slit member interposed between said dark field light luminous source and said dark field light inlet opening for adjusting the quantity of said dark field light.

4. A lighting device as defined in claim 1, further comprising a light field luminous source for emitting said light field light and a dark field luminous source for emitting said dark field light, said light field luminous source and dark field luminous source being provided independent from each other;

said light field luminous source and dark field luminous source each being applied thereto a voltage, to thereby permit the quantity of each of said light field light and dark field light emitted by said luminous sources to be adjusted.

* * * * *